Figure 1:
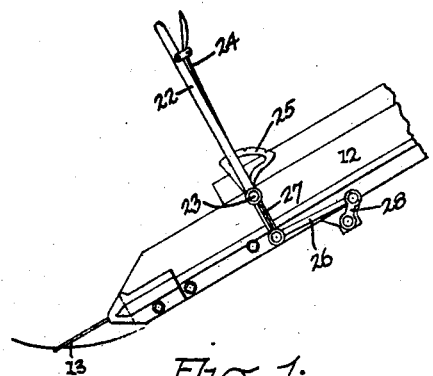

July 28, 1925.

A. L. HOOVER

DIGGER

Filed June 19, 1924

1,547,584

Arthur L. Hoover
Inventor
Attorneys

Patented July 28, 1925.

1,547,584

UNITED STATES PATENT OFFICE.

ARTHUR L. HOOVER, OF AVERY, OHIO, ASSIGNOR TO THE HOOVER MANUFACTURING COMPANY, OF AVERY, OHIO, A CORPORATION OF OHIO.

DIGGER.

Application filed June 19, 1924. Serial No. 720,962.

*To all whom it may concern:*

Be it known that I, ARTHUR L. HOOVER, a citizen of the United States of America, and a resident of Avery, in the county of Erie and State of Ohio, have invented certain new and useful Improvements in Diggers, of which the following is a full, clear, and exact description.

In diggers of the type herein shown it is customary to supply elliptical wheels adapted to replace certain of the conveyor supporting rollers, provided with teeth whereby they are driven from the conveyor, and effective by their rotation to impart an oscillation to the conveyor to facilitate removal of the dirt from the material carried by the conveyor, and customary to utilize these elliptical wheels when the digger is operated in tenaciously clinging soil. The change from one type of supporting wheel to the other, however, is inconvenient and undesirable and furthermore, in digging a field consisting partly of one type of soil and partly of another type of soil, it is impossible practically to continually change from one type of supporting wheel to the other and accordingly necessary to use one type or the other throughout and thus either fail to fully remove the dirt in one part of the field or else bruise the crop by over-agitation in the other part of the field. My invention provides means for oscillating the conveyor movable readily at will between operative and inoperative positions and accordingly my invention provides an oscillating means for the conveyor free from the defects of the means heretofore employed.

Figure 2:
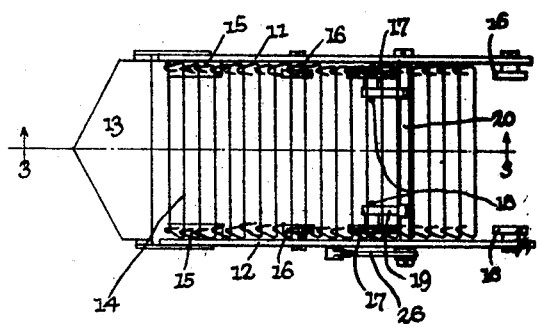
Figure 3:
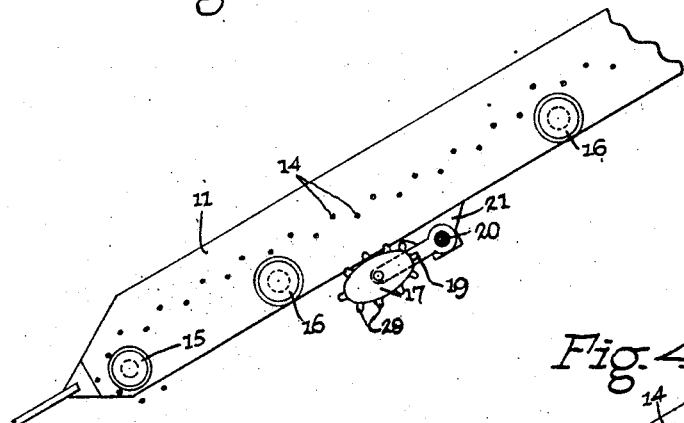
Figure 4:
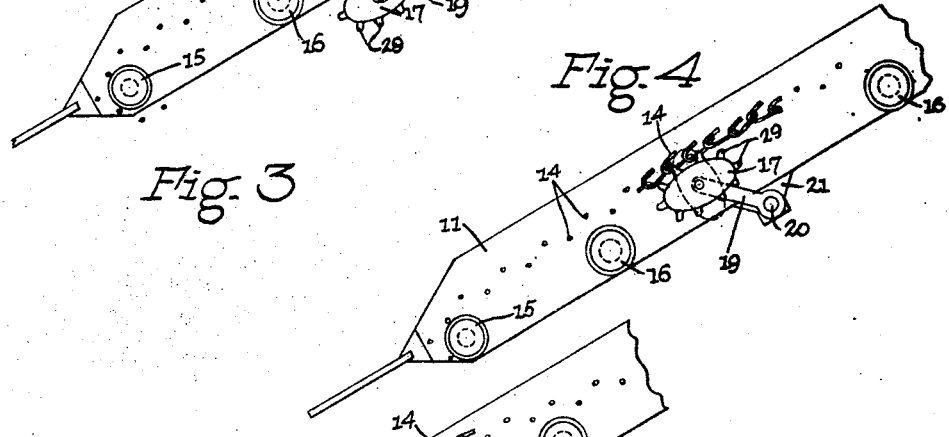
Figure 5:
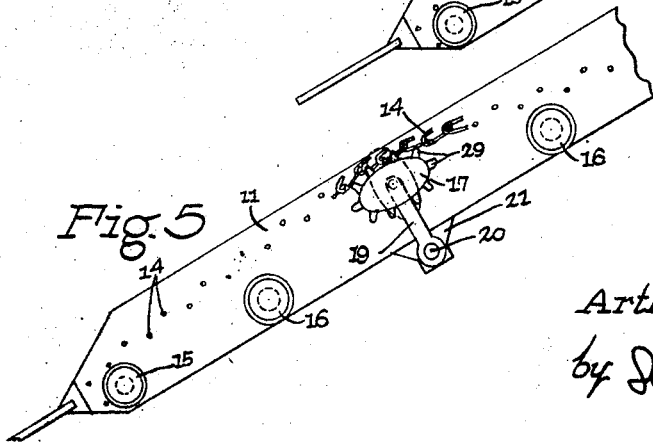

In the drawings accompanying this specification and forming a part thereof I have shown, for purposes of illustration, one form which my invention may assume. In these drawings:

Figure 1 is a side elevation of the portion of the digger concerned showing this illustrative form of my invention, Figure 2 is a plan view of the device shown in Figure 1, while Figures 3, 4, and 5 are sections on the line 3—3 of Figure 2 illustrating the oscillating mechanism in inoperative position, slightly operative position, and fully operative position, respectively.

In the drawings I have shown a portion of a digger comprising a pair of side plates 11 and 12 connected at their upper end to the body of the digger, suitably braced, and carrying at their lower ends the digger blade 13 arranged to raise the material being dug and deliver that material, and the dirt which accompanies it, onto a conveyor 14 which is in the form of an open chain and is supported at the lower end by means of a pair of wheels 15 secured to the side plates 11 and 12, intermediate the ends by rollers 16 secured to the side plates 11 and 12, and at the upper end by means of driving sprockets (not shown) through which the chain is operated from the wheels of the digger.

The means for oscillating the conveyor 14 is herein shown as comprising a pair of elliptical wheels 17 provided with teeth 29 arranged to mesh with the chain 14 and thus be driven by the conveyor 14 when they are positioned in engagement therewith, rotatable upon pins 18 projecting from the free ends of arms 19 secured to a rock shaft 20 rotatable in brackets 21 depending from the side plates 11 and 12, and movable by oscillation of the rock shaft 20 and arms 19 between the inoperative position shown in Figure 3 and the fully operative position shown in Figure 5 through the lightly operative position shown in Figures 2 and 4. The rock shaft 20 is itself operated and controlled from a hand lever 22 pivoted at 23 to the side plate 12, held in position by means of a latch 24 cooperating with a sector 25 also carried by the side plate 12, and connected to the rock shaft 20 by means of a link 26 extending between the depending arm 27 of the lever 22 and an arm 28 projecting from and integral with the rock shaft 20.

It will be apparent from the above description that the elliptical wheels 17 may be disposed in any position from the inoperative position of Figure 3 to the fully operative position of Figure 5 through various operative and inoperative positions such as the slightly operative position shown in Figures 2 and 4, that in the position shown in Figure 3 the wheels are ineffective to impart any oscillation to the conveyor 14 and the device is in proper condition for use in freely parting soil, that in the position shown in Figures 2 and 4 the wheels 17 impart a light oscillation to the conveyor 14 and the device is in condition for use in slightly clinging soil, that in the position shown in Figure 5, the wheels 17 impart a violent oscillation to the conveyor 14 and the device is in condition for use in tightly clinging soil, and that the position of the wheels 17 may be readily shifted from one position to another so that the proper amount of oscillation may be provided at all times even for various types of soil in different portions of the same field. It will therefore be obvious to those skilled in the art that the device herein disclosed accomplishes the purpose of my invention. It will also be obvious to those skilled in the art that the particular embodiment of my invention herein shown and described may be variously changed and modified without departing from the spirit of my invention or sacrificing the advantages thereof and it will therefore be understood that this disclosure is illustrative only and that my invention is not limited thereto.

I claim:

1. A digger comprising a frame, a conveyor supported upon said frame, a set of elliptical discs adapted to be positioned in contact with the under side of said conveyor and rotated to oscillate said conveyor to dislodge dirt from the material carried by said conveyor, and arms, carried by a rock shaft rotatably supported in said frame, arranged to support said discs in either of a plurality of operative positions engaging said conveyor and in each of which said discs operate with a different intensity, or in an inoperative position removed from said conveyor.

2. A digger comprising a frame, a conveyor supported upon said frame, a set of elliptical discs adapted to be positioned in contact with the under side of said conveyor and rotated directly by said conveyor to oscillate said conveyor to dislodge dirt from the material carried by said conveyor, and means carried by said frame and arranged to support said discs in either of a plurality of operative positions engaging said conveyor and in each of which said discs function with different intensities, or in an inoperative position removed from said conveyor.

3. A digger comprising a frame, a conveyor supported upon said frame, a set of elliptical discs adapted to be positioned in contact with the under side of said conveyor and rotated directly by said conveyor to oscillate said conveyor to dislodge dirt from the material carried by said conveyor, and means carried by said frame effective to control the functioning of said discs.

4. A digger comprising a frame, a conveyor supported upon said frame, a set of elliptical discs adapted to be positioned in contact with the under side of said conveyor and rotated directly by said conveyor to oscillate said conveyor to dislodge dirt from the material carried by said conveyor, and means carried by said frame and arranged to support said discs in either an operative position engaging said conveyor or an inoperative position removed from said conveyor.

5. A digger comprising a frame, a conveyor supported upon said frame, a set of elliptical discs driven by said conveyor and adapted to be positioned in contact with the under side of said conveyor and rotated to oscillate said conveyor to dislodge dirt from the material carried by said conveyor, and means carried by said frame effective to control the functioning of said discs.

6. A digger comprising a frame, a conveyor supported upon said frame, mechanism driven by said conveyor and adapted to oscillate said conveyor to dislodge dirt from the material carried by said conveyor, and means carried by said frame and arranged to support said mechanism in either an operative position or an inoperative position.

7. A digger comprising a frame, a conveyor supported upon said frame, a set of elliptical discs adapted to be positioned in contact with the under side of said conveyor and rotated to oscillate said conveyor to dislodge dirt from the material carried by said conveyor, and means carried by said frame and arranged to support said discs in either of a plurality of operative positions engaging said conveyor and in each of which said discs function with different intensities, or in an inoperative position removed from said conveyor.

8. A digger comprising a frame, a conveyor supported upon said frame, a set of elliptical discs driven by said conveyor and adapted to be positioned in contact with the under side of said conveyor and rotated to oscillate said conveyor to dislodge dirt from the material carried by said conveyor, and means carried by said frame and arranged to support said discs in either an operative position engaging said conveyor or an inoperative position removed from said conveyor.

9. A digger comprising a frame, a conveyor supported upon said frame, a set of elliptical discs adapted to be positioned in contact with the under side of said conveyor and rotated to oscillate said conveyor to dislodge dirt from the material carried by said conveyor, and means carried by said frame and arranged to support said discs in either an operative position engaging said conveyor or an inoperative position removed from said conveyor.

10. A digger comprising a frame, a conveyor supported upon said frame, a set of elliptical discs adapted to be positioned in contact with the under side of said conveyor and rotated directly by said conveyor to oscillate said conveyor to dislodge dirt from the material carried by said conveyor, and means carried by said frame effective to control the functioning of said discs to cause said disc to operate with any one of a plurality of different intensities, or not at all.

In testimony whereof, I hereunto affix my signature.

ARTHUR L. HOOVER.